Feb. 24, 1953 R. F. STERLING 2,629,698
CELLULAR EXPANDED THERMOSET RESINS
Filed Dec. 30, 1949
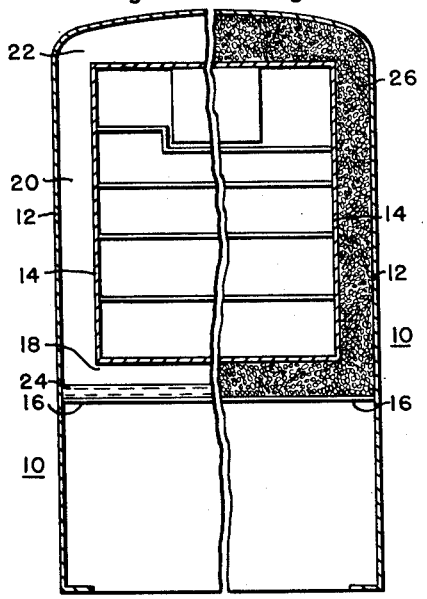
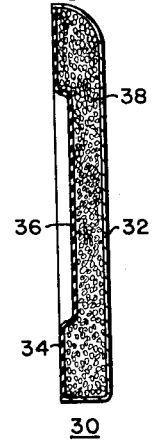
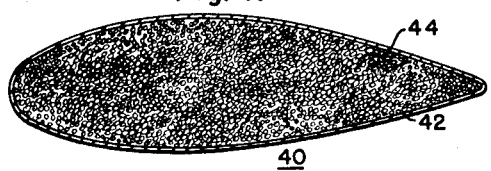
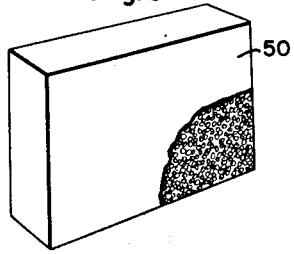
WITNESSES:
INVENTOR
Robert F. Sterling.
BY
Frederick Shopoe
ATTORNEY Patented Feb. 24, 1953

2,629,698

UNITED STATES PATENT OFFICE 2,629,698

CELLULAR EXPANDED THERMOSET RESINS

Robert F. Sterling, Pittsburgh, Pa., assignor to Westinghouse Electric Corporation, East Pittsburgh, Pa., a corporation of Pennsylvania Application December 30, 1949, Serial No. 136,101

9 Claims. (Cl. 260—2.5)

This invention relates to compositions that are capable of producing a cellular expanded thermoset body when heated, and to the process for producing the cellular expanded body and the resulting product.

This application is a continuation-in-part of my application Serial No. 62,136, filed November 26, 1948, now abandoned.

It has long been desirable to produce cellular expanded resin bodies from thermoset resins in such manner that the expansion may be controlled to provide for any desired density of cellular product. Furthermore, it has been held desirable to provide a composition in fluid form that may be introduced into a form, mold or space and upon subjecting the fluid composition to a simple and inexpensive treatment, the composition will expand in the form of a foam that thermosets into a cellular structure.

Heretofore, it has been known to prepare cellular products from resinous materials, but the process of securing the expanded product has been costly and difficult to apply for many purposes. In many cases, the resinous compositions have required processing in expensive equipment apart from the space to which the final cellular resin product was to be applied. Such expanded masses often required machining or forming to adapt them to the space to be filled. Such processes obviously are inherently costly and inconvenient.

There have been disclosed heretofore fluid compositions that may be prepared and poured into a mold, for example, whereupon the compositions began to foam spontaneously. With these foaming begins almost instantaneously with the admixture of all the components of the compositions so that there are no means to delay or to control the initiation of the foaming process. Accordingly, the components cannot be admixed as thoroughly as desired and the fineness and density of the foam suffered. Consequently the density of such previously known products has been high—above 2 pounds per cubic foot. The foams produced by these previously known self-foaming compositions are relatively coarse celled and posses other disadvantages.

The object of this invention is to provide a resinous fluid composition that may be introduced into any space and upon applying a simple heat-treatment, the composition will foam into a cellular mass of a predetermined density and thermosets.

A further object of the invention is to provide a process for producing an expanded cellular thermoset resin by applying a predetermined temperature to a fluid resinous composition whereupon the fluid foams into an expanded cellular mass and thermosets.

A still further object of the invention is to provide articles of manufacture embodying a casing, and within the casing there is disposed a thermoset cellular expanded resinous body adherent to the walls of the casing.

Other objects of the invention will in part be obvious, and will in part appear hereinafter.

For a better understanding of the nature and objects of the invention, reference should be had to the following detailed description and drawing, in which:

Figure 1 is a fragmentary vertical cross-section through a refrigerator cabinet containing the fluid expansible composition of this invention;

Fig. 2 is a fragmentary vertical cross-section through a refrigerator showing the cellular expanded thermoset resin;

Fig. 3 is a vertical cross-section through a refrigerator door with the interior of the door filled with the cellular expanded thermoset resin of this invention;

Fig. 4 is a vertical cross-section through an airfoil embodying a rigid exterior sheet and an interior space filled with the cellular expanded thermoset resin; and Fig. 5 is a perspective view through a molded block of the cellular expanded thermoset resin of this invention.

In accordance with this invention, a thermosettable resinous composition is produced that is relatively stable after having been prepared so that it may be prepared properly and applied for a reasonable period of time, which composition may be heated at a predetermined temperature to cause foaming to be initiated and it will then expand into a foamed cellular mass whose density is determined by the temperature of heat-treatment, and the cellular mass so produced thermosets promptly into a rigid structure. The composition is composed of (a) between 70 to 97 parts by weight of thermosetting partially reacted aqueous reaction product of a phenol and an aldehyde, (b) between 5% and 0.1% by weight of a surface active foam-increasing agent, and (c) between 25% and 1% by weight of at least one peroxide selected from the group consisting of calcium peroxide, sodium peroxide, potassium peroxide, lead peroxide, barium peroxide, magnesium peroxide, zinc peroxide and urea peroxide. The composition is prepared by admixing the three components at room temperature or lower, and it is stable for an hour in the large amounts required for commercial use, therefore lending itself to normal shop usage. If the peroxide component is not admixed therein, the composition is stable for prolonged periods of time of the order of months.

The phenol aldehyde resin (a) of the composition is a specific product. It is prepared by reacting one mole of at least one monohydric phenol selected from the group consisting of phenol (monohydroxy benzene), cresol, xylenol and cresylic acid, with from one to three moles of at least one aldehyde selected from the group consisting of formaldehyde, polymers of formaldehyde, acetaldehyde, hexamethylenetetramine and furfuraldehyde. The reaction is carried out in the presence of substantial quantities of water. The phenol and the aldehyde are reacted with an alkaline catalyst in the proportions of from 0.05% to 5% of the weight of the phenol. Any conventional alkaline catalyst suitable for promoting the reaction of phenol and formaldehyde into a phenolic resin may be employed. Examples of such catalysts are sodium hydroxide, potassium hydroxide, barium hydroxide, calcium hydroxide, calcium oxide, sodium carbonate, sodium bicarbonate, barium carbonate, ethylene diamine, propylene diamine, ammonia, hexamethylenetetramine, and aniline. It will be appreciated that other alkali and alkaline earth metal, oxides, hydroxides, carbonates, bicarbonates, and primary and secondary aliphatic and aryl amines may be employed. The reaction of the phenol and aldehyde may be carried out in the temperature range of between 50° C. and 125° C., with or without refluxing, for a period of time of from one-half hour using the maximum amount of the catalyst and the highest temperatures to as much as twenty hours or longer using the least amount of catalyst and the lowest reaction temperatures. The sufficiency of the reaction is determined by the nature of the resulting product as will be set forth.

After the reaction product has reached the desired state of reaction, it is partially dehydrated by applying a vacuum. It may be desired, though not necessary, to reduce the alkalinity of the reaction product, or even render it acidic, by treating it with acid prior to dehydration. Thus the reaction product may have a pH of as high as about 11, due to the alkaline catalyst used, to as low as 3 by the addition of an acid.

For reducing the pH organic acids, such as lactic, tartaric acid, citric acid, acetic acid, oxalic acid, malonic acid, maleic anhydride, phenol sulfonic acid, and formic acids will give good results. Mineral acids, such as hydrochloric, sulphuric and phosphoric acids, may also be introduced into the reaction product to produce the pH.

The dehydration of the resinous reaction product, whether acidified or not, is carried out to provide a product containing between 3% and 25% by weight of water and the balance being the partially reacted phenol-aldehyde resin. With this amount of water, the resin composition should be of a viscosity of between 1 and 250 poises as measured at 25° C. Excellent low density expanded cellular bodies have been obtained when the viscosity of the resinous product was between 10 and 60 poises. The dehydration may be carried out at a vacuum of from five inches of mercury absolute pressure or lower with a temperature during vacuum dehydration varying from about 50° C. to about 100° C. The cooled product after the partial dehydration is a liquid aqueous composition that is stable for prolonged periods of time and need only be combined with the required amount of one of the peroxides and one of the surface active agents to render it foamable and then thermosettable by heating.

Numerous surface active organic foam-increasing agents may be employed in the practice of the invention. Particularly satisfactory results have been obtained with the alkyl alkaline sulfosuccinates in which each alkyl group has between four and twenty-four carbon atoms. The dibutyl, dihexyl and dioctyl sodium sulfosuccinates, have been exceptionally suitable in producing very low density foams, some of which have been of a density of less than 0.35 pound per cubic foot. Another satisfactory group of foam-increasing agents are the alkyl aryl sulfates and sulfonates in which there is present one alkyl group having from four to thirty carbon atoms disposed in a long chain. Examples of this group are dodecyl benzene sodium sulfonate, octyl naphthalene sodium sulfonate, dodecylbenzene ethanolamine sulfonate, monobutyl phenyl-phenol sodium monosulfonate, monobutyl biphenyl sodium sulfonate, and the sodium salt of sulfated octoic acid ester of naphthalene. Alkyl aryl polyether alcohols and alkyl aryl polyether sulfonates in which the alkyl group has from four to twenty-four carbon atoms are suitable. Examples of this group are the octadecyl phenol ethylene oxide condensation product and the polymers of such product, the sodium salt of dodecyl phenol ethylene oxide, and the sodium salt of decyl phenol ethylene oxide sulfate. The manufacture of members of this group is disclosed in detail in Patents 2,454,541, 2,454,542, 2,454,543 and 2,454,544. The alkaline soaps of fatty acids having from twelve to twenty-four carbon atoms may be employed in preparing the foamable compositions. Examples of such soaps are sodium stearate, potassium oleate, triethanolamine palmitate, aminoethanolamine oleate and ammonium laurate. The sorbitan esters of acids having from twelve to twenty-four carbon atoms are suitable surface active agents. Examples thereof are sorbitan monolaurate and sorbitan trioleate. Another satisfactory group of surface active agents comprises the polyoxyalkylene sorbitan esters of acids containing from twelve to twenty-four carbon atoms. Examples of these compounds are polyoxyethylene sorbitan monolaurate, polyoxyethylene sorbitan tristearate, polyoxyethylene sorbitol monolaurate, polyoxypropylene-ethylene sorbitan monolaurate, and polyoxyethylene sorbitol pentaoleate. The preparation of some of these compounds is described in Patent 2,380,166. The alkyl and alkaryl quaternary ammonium halide compounds wherein at least one alkyl group of the former has from eight to twenty-four carbon atoms, and at least one alkaryl group of the latter has from eight to twenty-four carbon atoms, are suitable surface active agents. Examples of suitable quaternary ammonium compounds are cetyl dimethyl benzyl ammonium chloride, octadecyl dimethyl benzyl ammonium chloride, octadecanol-9-dimethyl ethyl ammonium bromide, and diisobutylphenoxyethoxy ethyl dimethyl benzyl ammonium chloride.

Another excellent group of foam increasing agents comprises the alkyl sulfates and sulfonates wherein the alkyl groups have from eight to thirty carbon atoms. Examples thereof are lauryl sodium sulfate, sodium sulfated monoglyceride of oleic acid, octadecanol sodium sulfate, octyl alcohol potassium sulfate, lauryl methanol sulfonate, and sodium petroleum sulfonate. The sulfated and sulfonated alkyl amines and amides wherein there is present at least one alkyl group with from eight to twenty-four carbon atoms, have been employed with success. Examples of this group are the triethanolamine oleate sulfate, sodium salt of lauryl aminosulfate, sulfated octyl amine, lauryl amine sulfate, aminated mixture of lauryl and myristyl sulfate esters, butyl amine salt of dodecyl benzene sulfonic acid and the sodium salt of the sulfonated reaction product of oleyl chloride and methyl taurine, having the formula:

$$C_{17}H_{33}CON(CH_3)-CH_2CH_2SO_3Na$$

It will be understood that the above is not exhaustive, but that other surface active materials can be employed.

The following examples illustrate the compositions of the invention.

Example I

A phenol aldehyde resin was prepared by reacting 1 mole of phenol with 2½ moles of 40% aqueous formaldehyde with sodium hydroxide as a catalyst in the proportion of 1¼% of the weight of the phenol. The reaction was carried out for three hours without refluxing at a temperature of from 77° C. to 83° C. At the end of this period, sufficient lactic acid was added to reduce the pH of the reaction mixture to a value of 6. The acidified product was dehydrated under a vacuum varying from 25½ inches of mercury to 27½ inches of mercury to a final temperature of 75° C. When cooled to room temperature, the resinous composition had a viscosity of between 46 and 65 poises. It contained approximately 15% by weight of water.

The phenol formaldehyde resin of this example was employed to prepare the following expansible composition:

(a) Phenol formaldehyde resin, 91% by weight
(b) Dioctyl sodium sulfosuccinate, 2%
(c) Calcium peroxide, 7%

The calcium peroxide in this example was a commercial product containing between 60% and 70% of calcium peroxide, the remainder being calcium oxide and calcium hydroxide. The mixture so prepared after being thoroughly stirred was poured into a form and heated in an oven. By varying the oven temperature from 125° C. to 300° C., cellular expanded bodies of thermoset resin of varying densities were prepared. At 190° C., the density was 0.39 pound per cubic foot. At 160° C., the density was 0.6 pound per cubic foot. At lower temperatures, the density was greater.

Example II

Into a reaction vessel there was charged phenol and 40% aqueous formaldehyde in the proportions of 1 mole of phenol to 2½ moles of formaldehyde with 3%, based on the weight of the phenol, of sodium hydroxide. The contents of the vessel were heated for three hours at a temperature of between 75° C. and 80° C. The reaction product was vacuum dehydrated to eliminate part of the water leaving 17% of water in the reaction product, which had a viscosity of 50–55 poises at room temperature.

A foamable composition was prepared from (a) 81 parts by weight of partially reacted phenolic resin of this example, (b) 2 parts of octadecyl phenol ethylene oxide condensation product and (c) 17 parts of calcium peroxide (60%–70% actual calcium peroxide). Gallon lots of the composition after thorough admixture was stable for an hour at room temperature. Upon pouring it into the hollow walls of a beverage cooler cabinet, and heating at 150° C. the composition foamed and filled the space in the hollow walls, and thermoset into a cellular body in 30 minutes. The density of the thermoset cellular body was approximately 0.5 pound per cubic foot. This composition was foamable to densities of less than 0.35 pound per cubic foot. The cellular thermoset products were exceedingly fine grained.

Example III

A phenol aldehyde resin was prepared by reacting the phenol, formaldehyde and sodium hydroxide mixture of Example I under reflux for 1½ hours at 97° C. After neutralizing to a pH of 6 with lactic acid, the reaction product was dehydrated to a vacuum of 29.8 inches of mercury for fifteen minutes to a viscosity of 36 poises. The water content was approximately 10% by weight.

The following expansible resin composition was prepared from this phenol formaldehyde reaction product:

(a) Phenol formaldehyde resin, 90%
(b) Sodium oleate, 2%
(c) Magnesium peroxide, 8%

When poured into a form and heat-treated at temperatures of between 125° C. and 350° C., expanded cellular thermoset bodies of low density were produced.

Example IV

A resin was prepared by reacting 1.25 moles of formaldehyde (40% aqueous solution) with one mole of cresylic acid and 1% ethylene diamine based on the weight of the cresylic acid added as a catalyst. The mixture was refluxed for twenty minutes, acidified with acetic acid to a pH of 6.5 and dehydrated under vacuum to a viscosity of 15 poises. The product contained 18% by weight of water.

From this cresylic acid formaldehyde reaction product, there was prepared the following expansible composition:

(a) Cresylic formaldehyde resin, 90%
(b) Dioctyl sodium sulfosuccinate, 2%
(c) Calcium peroxide, 6%
  Polyvinyl butyral, 2%

The polyvinyl butyral was added to enable a tougher, elastic cellular structure to be produced upon heat-treating the composition at temperatures of between 125° C. and 350° C. Expanded cellular thermoset bodies of low density were produced from this composition upon heat-treatment over this range of temperatures.

Example V

A composition was prepared by admixing 96% by weight of the phenol formaldehyde resin of Example II, 1% of 2-decyl benzene sodium sulfonate and 3% of calcium peroxide. This composition when heated at a temperature of between 125° C. and 350° C. produced excellent low density expanded cellular structures.

Example VI

A phenol aldehyde resin was prepared by reacting phenol, 1 mole; 40% aqueous formaldehyde, 2.5 moles; ½%, based on the weight of the phenol, of sodium hydroxide. The mixture was heated for 3½ hours at a temperature of between 64° C. and 80° C. and then treated with lactic acid to bring the pH of the product to 6. The product was then dehydrated under vacuum to a viscosity of 36 poises. The water content was 14% by weight.

The resulting resinous product was employed in preparing the following composition:

(a) Phenol formaldehyde resin, 90 parts
(b) Dioctyl sodium sulfosuccinate, 10 parts
(b) Cetyl dimethyl benzyl ammonium chloride, 5 parts
(c) Calcium peroxide, 5 parts When heated at a temperature of 180° C., it produced a cellular thermoset body of a density of 0.73 pound per cubic foot.

Example VII

The following phenol aldehyde reaction product was prepared: phenol, 1 mole; 40% aqueous formaldehyde, 1.1 moles; sodium hydroxide, 0.4%. The mixture was heated for sixteen hours at a temperature of from 60° C. to 90° C. and was neutralized to a pH of 6 with tartaric acid after which it was dehydrated under a 26 inch vacuum to a viscosity of 22 poises. The product contained 20% by weight of water.

A composition was prepared by admixing (a) 92% by weight of the resinous product so produced with (b) 5% 2-decyl benzene sodium sulfonate and (c) 3% by weight of barium peroxide. When heated to a temperature of 240° C., the composition produced an expanded cellular structure of a density of 1.2 pounds per cubic foot.

Example VIII

The following were reacted: phenol, 1 mole; acetaldehyde, 2 moles; sodium hydroxide, 1¼%. The mixture was heated for six hours over a temperature range of from 75° C. to 92° C. Thereafter, the mixture was acidified with acetic acid to a pH of 6.5 and then dehydrated under a vacuum of 27 inches of mercury at a maximum temperature of 118° C. The viscosity was approximately 2½ poises. The water content of the resinous product was 22%.

The resinous product of this example was employed in preparing the following composition:

(a) Phenol acetaldehyde resin, 85%
(b) 2-decyl benzene sodium sulfonate, 8%
(c) Calcium peroxide, 7%

When subjected to a temperature of 240° C., the composition produced a cellular expanded thermoset structure of a density of 4.5 pounds per cubic foot.

Example IX

The following were reacted: phenol, 1 mole; furfuraldehyde, 1.25 moles; potassium hydroxide, 1.25%. The composition was refluxed two and a half hours at a temperature of 109° C. After neutralizing with lactic acid to a pH of 5, the product was dehydrated to a viscosity of 148 poises.

The following expansible composition was prepared from this resin:

(a) Phenol furfuraldehyde resin, 88 parts
    Glycerin, 6 parts
(b) Dioctyl sodium sulfosuccinate, 4 parts
(b) Cetyl dimethyl benzyl ammonium chloride, 1 part
(c) Calcium peroxide, 3 parts.

When heated at a temperature of 270° C., the composition produced an expanded cellular structure of a density of 4.4 pounds per cubic foot. In this composition, the glycerin provided for plasticizing the resin, thereby enabling a tougher structure.

Example X

The following were reacted: m,p-cresol, 1 mole; 40% aqueous formaldehyde, 1.25 moles; ethylene diamine, 0.005 mole. After refluxing for twenty minutes at 98° C., the product was found to have a pH of 7 and was dehydrated by vacuum to a viscosity of 13 poises.

The cresol formaldehyde resin of this example was employed in preparing the following composition:

Cresol formaldehyde resin, 90%
Octadecyl phenol ethylene oxide condensation product
Calcium peroxide, 5%

The composition when heated within a range of temperatures of between 125° C. and 350° C. produced excellent expanded cellular structures.

A number of compositions were prepared by admixing 81 parts by weight of the dehydrated partially reacted phenolic resin of Example II, 17 parts by weight of 60%–70% calcium peroxide and 2 parts of each of the following:

1. Dihexyl sodium sulfosuccinate
2. Dodecyl benzene sodium sulfonate
3. Lauryl sodium sulfate
4. Sodium stearate
5. Polyoxyethylene sorbitan monooleate (Tween 80)
6. Sorbitan monolaurate (Span 20)
7. Sodium salt of lauryl amide sulfate.

In each instance a relatively stable composition resulted on admixing the three components. Upon heating the composition to temperatures above 110° C., and preferably between 150° C. and 200° C., rapid foaming took place followed by thermosetting of the foam into cellular bodies. Depending on the temperature of heating the density varied from 0.4 to 1.0 pound per cubic foot.

In order to provide for somewhat tougher cellular walls in the expanded resin, there may be included in the expansible composition in an amount of not over 8% of its weight of at least one thermoplastic resin selected from the group consisting of polyvinylals, polyvinyl esters, hydrolysis products of polyvinyl esters, cellulose esters, cellulose ethers, polyvinylidene chloride, polyacrylates, polymers of acrylic acid esters and polymers of alkyl acrylic acid esters. Typical examples of the above that have been employed with success are polyvinyl butyral, polyvinyl acetate, polyvinylidene chloride, cellulose acetate, ethyl cellulose, polyvinyl alcohol (for example, the 80% hydrolysis product of polyvinyl acetate), polymethacrylate, and polymethylmethacrylate.

Plasticity may be imparted to the phenol aldehyde resin by incorporating up to ½ mole of a polyhydric alcohol per mole of phenol. Suitable polyhydric alcohols are glycerol and aliphatic liquid glycerols of up to eight carbon atoms, such for example as diethylene glycol.

To secure a predetermined texture or to strengthen the cellular thermoset composition, there may be added to the composition prior to its heat-treatment, an amount not exceeding 10% of the weight of the composition of finely divided inert solids. Finely divided silica flour, wood flour, walnut shell flour, asbestos fibers, silica gel, acetylene black, aluminum powder and mica are examples of suitable materials. Wood flour and finely divided cotton fibers in particular enable a tougher, stronger cellular product to be produced. For example, the composition of Example I was successfully foamed with up to 5% of silica flour (325 mesh), silica gel, microfine asbestos fibers and aluminum powder. No noticeable decrease in density of the cellular insulation was noted.

The compositions as set forth herein have proved to be extremely useful in the preparation of thermal insulation, particularly for refrigerated casings.

Referring to Figure 1 of the drawing, there is illustrated a household refrigerator 10 comprising a steel outer shell 12, a steel inner foot-storing compartment 14, and a lower shelf 16, arranged to form a bottom space 18, a space 20 at the sides, and a space 22 at the top surrounding the compartment 14. Previously, it has been customary to insert slabs of cork or glass wool batting into the spaces 18, 20 and 22 in order to thermally insulate the food compartment from the exterior surface of the refrigerator. This was not only expensive as to the manual operations required, but necessitated the handling of large volumes of light insulating materials which required enormous storage space and considerable shipping and preparation facilities.

In accordance with the present invention, into the refrigerator 10 there is poured a small amount 24 of the liquid composition of this invention, and the refrigerator is then placed in a furnace or oven at a suitable temperature—preferably, between 150° C. and 250° C. to secure a low density cellular body—where in a few minutes the composition 24 will begin to expand in a foam-like mass that will fill the spaces 18, 20 and 22 substantially completely. It has been found that the expanding composition will penetrate into extremely narrow crevices, and the density of the expanded cellular foam is extremely uniform. After expanding, the cellular structure thermosets in a very short period of time by reason of the heating and the catalytic action of the peroxide present and the products generated therefrom.

As illustrated in Fig. 2 of the drawing, after heat-treatment a thermoset expanded cellular structure 26 fills the spaces between the outer shell 12 and the food compartment 14 of the refrigerator 10. In tests of thermal conductivity, the composition of the present invention applied to a refrigerated cabinet has possessed a thermal conductivity of from 0.2 to 0.3 B. t. u. per hour per square foot per degree Fahrenheit per inch thickness of insulation. In other cases, thermal conductivity values even lower have been obtained.

A particular advantage of the present compositions arises from the property of the expanded composition of adhering tenaciously to metals and plastics. The expanded cellular structure 26 of Fig. 2 is extremely adherent to the walls of the casing 12 and to the food compartment 14. They cannot be separated from one another without shearing and tearing the expanded cellular resin. It has been found that when the metal shells are so separated, there will be very little if any of the cellular composition detaching from any of the metal walls. Because of this adherence, the expanded cellular structures will not become loose or packed down with vibration or by reason of other physical abuse. The expanded composition also improves the corrosion-resistance of the metal surfaces in contact with which it has expanded. The resinous compositions are not subject to attack by fungi or other destructive organisms. The expanded compositions will not support combustion though the surface will char when exposed to an open flame. At temperatures of use of up to 100° C., it is extremely durable and stable, and provides outstanding thermal insulation.

Referring to Fig. 3 of the drawing, there is illustrated a refrigerator door 30 comprising a metal outer panel 32 and a laminated plastic liner 34 comprising, for example, a phenol formaldehyde resin and paper sheets. The liner 34 contains a dished portion 36 for stiffness. The space between the metal panel 32 and the laminated liner 34 is filled with the expanded cellular resinous product of this invention secured by pouring a selected amount of the fluid composition into the space and heating the door at a temperature of between 125° C. and 350° C. for a few minutes. The cellular resin 36 will not only fill the space in the door thereby providing excellent thermal insulation, but will bond to both the metal 32 and the laminated liner 34. This will reduce vibration and provide a better corrosion-resistant door.

The cellular compositions produced in accordance with the present invention are further useful in the preparation of structural members of great strength for a given weight. Thus in aircraft, airfoils 40 and the like may be prepared as illustrated in Fig. 4, from a strong formed shell 42 of steel, aluminum, or other metal, or a plastic, such, for example, as a phenol formaldehyde laminate embodying cotton, paper, or glass fiber cloth, or other resin reinforced with strengthening fibrous material. Within the space defined by the shell 42, there is expanded the fluid compositions of the present invention to fill the space with a thermoset expanded cellular filling 44. The density of the cellular thermoset product may be controlled by proportioning the components of the composition and the temperature at which it is heated so that the filling 44 may be of a density of the order of 10 pounds per cubic foot with considerable inherent strength and toughness imparted to it by the use of suitable plasticizers and reinforcing fibers. Since the filling 44 adheres to the shell 42, it renders the shell extremely rigid. The overall density of the airfoil 40 is low, but it possesses extremely high strength for its weight. The airfoil 40 resists wrinkling and other distortion that would cause failure at a relatively low load.

Members having utility in buoyancy applications are particularly readily constructed by the use of the compositions of the present invention. Floats, vessels and the like, may be prepared by filling a shell with the cellular composition generated in place from a predetermined amount of the fluid composition. Non-sinkable boats and the like, of extremely light weight, may be constructed from the compositions using laminated wood, metal or reinforced plastic disposed as a hollow shell in which the composition is expanded. The cellular compositions are rot-proof and vermin-proof. They also protect metal surfaces to which they are applied from corrosion. Prefabricated wall sections composed of metal panels, bracing and fasteners were successfully insulated by foaming the present compositions therein.

For some purposes, it may be desirable to form molded cellular thermoset bodies of predetermined density. Metal molds or forms of suitable size and shape may be lined with a sheet of paper or cellophane or the like and a selected amount of the fluid expansible composition placed in the lined mold. Upon heating the mold and the contained composition to a predetermined temperature, the composition will expand into the thermoset cellular structure. Thereafter, the expanded cellular structure may be readily removed from the mold because of the presence of the paper or cellophane liner. The mold may be relined and reused.

Referring to Fig. 5 of the drawing, there is illustrated a preformed member 50 so produced. In practice, there have been produced objects having dimensions of several feet in diameter of extremely intricate shape as, for example, a star-shaped cross-section, of densities ranging from 0.4 to 10 pounds per cubic foot. Such members have utility for insulating buildings, commercial refrigerating plants, for sound insulation, and other purposes. Decorative bodies, as for window displays, may be so prepared at low cost.

The expanded cellular structures are substantially odorless after having been heat-treated. The resin compositions after expanding are substantially neutral and therefore do not accelerate corrosion of metal surfaces with which they come in contact.

Since certain obvious changes may be made in the above procedure and different embodiments of the invention could be made without departing from the scope thereof, it is intended that all matter contained in the above description and drawing shall be taken in connection with the accompanying claims and not in a limiting sense.

I claim as my invention:

1. The method of preparing a cellular expanded thermoset resinous body comprising admixing (a) between 70% and 97% by weight of a thermosetting partially reacted aqueous reaction product of one mole of at least one monohydric phenol selected from the group consisting of phenol, cresol, xylenol and cresylic acid and between 1 and 3 moles of at least one aldehyde selected from the group consisting of formaldehyde, polymers of formaldehyde, acetaldehyde, hexamethylenetetramine, and furfuraldehyde, the reaction being carried out in the presence of from 0.05% to 5%, based on the weight of the phenol, of an alkaline catalyst for the reaction, the reaction being carried out in the presence of substantial amounts of water at a temperature of between 50° C. and 115° C. for a time of between ½ hour and 20 hours, and dehydrating the reaction product while maintaining it at a pH of between 3 and about 11 to provide a resinous product containing between 3% and 25% water and having a viscosity of between 1 and 250 poises, (b) between 5% and 0.1% by weight of a surface active, organic foam-increasing agent selected from the group consisting of alkyl alkaline sulfosuccinates in which there is an alkyl group having between four and twenty-four carbon atoms, alkyl aryl sulfates and sulfonates in which the alkyl groups have from four to thirty carbon atoms disposed in a long chain, alkyl aryl polyether alcohols and alkyl aryl polyether sulfonates in which the alkyl group has from eight to twenty-four carbon atoms, alkali soaps of fatty acids having from twelve to twenty-four carbon atoms, polyoxyalkylene sorbitan esters of acids containing from twelve to twenty-four carbon atoms, sorbitan esters of acids having from twelve to twenty-four carbon atoms, alkyl and alkaryl quaternary ammonium halide compounds wherein at least one alkyl group of the former has from eight to twenty-four carbon atoms, and at least one alkaryl group of the latter totals from eight to twenty-four carbon atoms, alkyl sulfates and sulfonates wherein the alkyl groups have from eight to thirty carbon atoms, and sulfated and sulfonated alkyl amines and amides wherein there is one alkyl group having from eight to twenty-four carbon atoms, and (c) between 25% and 1% by weight of at least one peroxide from the group consisting of the peroxides of calcium, sodium, potassium, lead, barium, magnesium, zinc and urea, and heating the mixture to a temperature of between 110° C. and 350° C. whereby a cellular expanded thermoset resin body is produced.

2. The process of claim 1, wherein there is added to the mixture before heating, not over 8% of its weight of at least one thermoplastic resin selected from the group consisting of polyvinylals, polyvinyl esters, hydrolysis products of polyvinyl esters, cellulose esters, cellulose ethers, polyvinylidene chloride, polymers of acrylic acid esters and polymers of alkyl acrylic acid esters.

3. The process of claim 1, wherein the partially reacted reaction product is admixed with up to 0.5 mole of a polyhydric alcohol selected from the group consisting of glycerol and aliphatic liquid glycols having up to eight carbon atoms.

4. The process of claim 1, wherein there is added to the mixture not over 10% of finely divided solids before heating.

5. The method of preparing a cellular expanded thermoset resinous body comprising admixing (a) between 70% and 97% by weight of a thermosetting partially reacted aqueous reaction product of one mole of at least one monohydric phenol selected from the group consisting of phenol, cresol, xylenol and cresylic acid and between 1 and 3 moles of at least one aldehyde selected from the group consisting of formaldehyde, polymers of formaldehyde, acetaldehyde, hexamethylenetetramine, and furfuraldehyde, the reaction being carried out in the presence of from 0.05% to 5%, based on the weight of the phenol, of an alkaline catalyst for the reaction, the reaction being carried out in the presence of substantial amounts of water at a temperature of between 50° C. and 115° C. for a time of between ½ hour and 20 hours, adding an acid to reduce the pH to a value of between 3 and 7, and dehydrating the reaction product to provide a resinous product containing between 3% and 25% water and having a viscosity of between 1 and 250 poises, (b) between 5% and 0.1% by weight of a surface active, organic foam-increasing agent selected from the group consisting of alkyl alkaline sulfosuccinates in which there is an alkyl group having between four and twenty-four carbon atoms, alkyl aryl sulfates and sulfonates in which the alkyl groups have from four to thirty carbon atoms disposed in a long chain, alkyl aryl polyether alcohols and alkyl aryl polyether sulfonates in which the alkyl group has from eight to twenty-four carbon atoms, alkali soaps of fatty acids having from twelve to twenty-four carbon atoms, polyoxyalkylene sorbitan esters of acids containing from twelve to twenty-four carbon atoms, sorbitan esters of acids having from twelve to twenty-four carbon atoms, alkyl and alkaryl quaternary ammonium halide compounds wherein at least one alkyl group of the former has from eight to twenty-four carbon atoms, and at least one alkaryl group of the latter totals from eight to twenty-four carbon atoms, alkyl sulfates and sulfonates wherein the alkyl groups have from eight to thirty carbon atoms, and sulfated and sulfonated alkyl amines and amides wherein there is one alkyl group having from eight to twenty-four carbon atoms, and (c) between 25% and 1% by weight of at least one peroxide from the group consisting of the peroxides of calcium, sodium, potassium, lead, barium, magnesium, zinc and urea, and heating the mixture to a temperature of between 110° C. and 350° C. whereby a cellular expanded thermoset resin body is produced.

6. The method of preparing a cellular thermoset resinous body comprising heating to a temperature of between 125° C. and 350° C. a fluid composition comprising (a) between 70% and 97% by weight of the partially reacted phenolic resin derived by heating for from ½ to 20 hours between a temperature of from 50° C. to 115° C. one mole of phenol with from 1 to 3 moles of formaldehyde in admixture with from 0.05% to 5%, based on the weight of the phenol, of an alkaline catalyst for the reaction, in the presence of substantial amounts of water, thereafter partially dehydrating the reaction product to provide a product having between 3% and 25% by weight of water and having a viscosity of between 1 and 250 poises at 25° C., (b) between 5% and 0.1% by weight of a surface active organic agent having foam increasing properties, and (c) between 25% and 1% by weight of at least one peroxide selected from the group consisting of calcium, lead, sodium, potassium, barium, magnesium, zinc and urea peroxide.

7. A composition suitable for preparing expanded cellular thermoset resinous bodies comprising (a) between 70% and 97% by weight of a thermosetting partially reacted aqueous reaction product of one mole of at least one monohydric phenol selected from the group consisting of phenol, cresol, xylenol and cresylic acid and between 1 and 3 moles of at least one aldehyde selected from the group consisting of formaldehyde, polymers of formaldehyde, acetaldehyde, hexamethylenetetramine, and furfuraldehyde, the reaction being carried out in the presence of from 0.05% to 5%, based on the weight of the phenol, of an alkaline catalyst for the reaction, the reaction being carried out in the presence of substantial amounts of water at a temperature of between 50° C. and 115° C. for a time of between ½ hour and 20 hours, and dehydrating the reaction product while maintaining it at a pH of between 3 and about 11 to provide a resinous product containing between 3% and 25% water and having a viscosity of between 10 and 60 poises, (b) between 5% and 0.1% by weight of a surface active, organic foam-increasing agent selected from the group consisting of alkyl alkaline sulfo-succinates in which there is an alkyl group having between four and twenty-four carbon atoms, alkyl aryl sulfates and sufonates in which the alkyl groups have from four to thirty carbon atoms disposed in a long chain, alkyl aryl polyether alcohols and alkyl aryl polyether sulfonates in which the alkyl group has from eight to twenty-four carbon atoms, alkali soaps of fatty acids having from twelve to twenty-four carbon atoms, polyoxyalkylene sorbitan esters of acids containing from twelve to twenty-four carbon atoms, sorbitan esters of acids having from twelve to twenty-four carbon atoms, alkyl and alkaryl quaternary ammonium halide compounds wherein at least one alkyl group of the former has from eight to twenty-four carbon atoms and at least one alkaryl group of the latter totals from eight to twenty-four carbon atoms, alkyl sulfates and sulfonates alkyl amines and amides wherein there is one alkyl group having from eight to twenty-four carbon atoms, and (c) between 25% and 1% by weight of at least one peroxide from the group consisting of the peroxides of calcium, sodium, potassium, lead, barium, magnesium, zinc and urea.

8. A composition suitable for preparing expanded cellular thermoset resinous bodies comprising (a) between 70% and 97% by weight of the partially reacted phenolic resin derived by heating for from ½ to 20 hours between a temperature of from 50° C. to 115° C. one mole of phenol with from 1 to 3 moles of formaldehyde in admixture with from 0.05% to 5%, based on the weight of the phenol, of an alkaline catalyst for the reaction, in the presence of substantial amounts of water, thereafter partially dehydrating the reaction product to provide a product having between 3% and 25% by weight of water and having a viscosity of between 1 and 250 poises at 25° C., (b) between 5% and 0.1% by weight of a surface active organic agent having foam increasing properties, and (c) between 25% and 1% by weight of at least one peroxide selected from the group consisting of calcium, lead, sodium, potassium, barium, magnesium, zinc and urea peroxide.

9. A composition suitable for preparing expanded cellular thermoset resinous bodies comprising (a) between 70% and 97% by weight of a thermosetting partially reacted aqueous reaction product of one mole of at least one monohydric phenol selected from the group consisting of phenol, cresol, xylenol and cresylic acid and between 1 and 3 moles of at least one aldehyde selected from the group consisting of formaldehyde, polymers of formaldehyde, acetaldehyde, hexamethylenetetramine, and furfuraldehyde, the reaction being carried out in the presence of from 0.05% to 5%, based on the weight of the phenol, of an alkaline catalyst for the reaction, the reaction being carried out in the presence of substantial amounts of water at a temperature of between 50° C. and 115° C. for a time of between ½ hour and 20 hours, adding an acid to reduce the pH to a value of between 3 and 7, and dehydrating the reaction product while maintaining it at a pH of between 3 and about 13 to provide a resinous product containing between 3% and 25% water and having a viscosity of between 10 and 60 poises, (b) between 5% and 0.1% by weight of a surface active, organic foam-increasing agent selected from the group consisting of alkyl alkaline sulfo-succinates in which there is an alkyl group having between four and twenty-four carbon atoms, alkyl aryl sulfates and sulfonates in which the alkyl groups have from four to thirty carbon atoms disposed in a long chain, alkyl aryl polyether alcohols and alkyl aryl polyether sulfonates in which the alkyl group has from eight to twenty-four carbon atoms, alkali soaps of fatty acids having from twelve to twenty-four carbon atoms, polyoxyalkylene sorbitan esters of acids containing from twelve to twenty-four carbon atoms, sorbitan esters of acids having from twelve to twenty-four carbon atoms, alkyl and alkaryl quaternary ammonium halide compounds wherein at least one alkyl group of the former has from eight to twenty-four carbon atoms, and at least one alkaryl group of the latter totals from eight to twenty-four carbon atoms, alkyl sulfates and sulfonates wherein the alkyl groups have from eight to thirty carbon atoms, and sulfated and sulfonated alkyl amines and amides wherein there is one alkyl group having from eight to twenty-four carbon atoms, and (c) between 25% and 1% by weight of at least one peroxide from the group consisting of the peroxides of calcium, sodium, potassium, lead, barium, magnesium, zinc and urea, whereby upon heating the mixture to a temperature of between 110° C. and 350° C. a cellular expanded thermoset resin body is produced.

ROBERT F. STERLING.

REFERENCES CITED

The following references are of record in the file of this patent:

UNITED STATES PATENTS

| Number | Name | Date |
|---|---|---|
| 2,446,429 | Nelson et al. | Aug. 3, 1948 |

FOREIGN PATENTS

| Number | Country | Date |
|---|---|---|
| 538,624 | Great Britain | Aug. 11, 1941 |
| 583,796 | Great Britain | Dec. 31, 1946 |
| 885,581 | France | May 31, 1943 |